(12) United States Patent
Ariga et al.

(10) Patent No.: US 9,466,001 B1
(45) Date of Patent: Oct. 11, 2016

(54) IMAGE PROCESSING APPARATUS AND COMPUTER-READABLE STORAGE MEDIUM

(71) Applicant: TOSHIBA TEC KABUSHIKI KAISHA, Tokyo (JP)

(72) Inventors: Norimasa Ariga, Izunokuni Shizuoka (JP); Kazuki Taira, Tokyo (JP); So Ishika, Ome Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/680,845

(22) Filed: Apr. 7, 2015

(51) Int. Cl.
*G06K 9/00* (2006.01)
*G06K 9/62* (2006.01)

(52) U.S. Cl.
CPC ......... *G06K 9/00791* (2013.01); *G06K 9/6202* (2013.01)

(58) Field of Classification Search
None
See application file for complete search history.

(56) References Cited

U.S. PATENT DOCUMENTS

| | | | |
|---|---|---|---|
| 9,098,888 B1* | 8/2015 | Lin | G06K 9/18 |
| 2008/0192840 A1* | 8/2008 | Hua | G06F 17/30793 |
| | | | 375/240.26 |
| 2011/0069905 A1* | 3/2011 | Adiga | G06T 7/0012 |
| | | | 382/276 |
| 2012/0075440 A1* | 3/2012 | Ahuja | G06T 7/0081 |
| | | | 348/61 |
| 2014/0036054 A1* | 2/2014 | Zouridakis | G06T 7/0012 |
| | | | 348/77 |
| 2014/0168478 A1* | 6/2014 | Baheti | G06K 9/2081 |
| | | | 348/240.99 |
| 2014/0267381 A1* | 9/2014 | Young | G06T 7/0002 |
| | | | 345/619 |
| 2015/0254401 A1* | 9/2015 | Sankhe | H04N 1/00127 |
| | | | 382/132 |

FOREIGN PATENT DOCUMENTS

JP        4412214        2/2010

OTHER PUBLICATIONS

Brunner et al. "Visual Metrics for the Evaluation of Sensor Data Quality in Outdoor Perception," presented at PersMIS, Sep. 28-30, 2010, Baltimore, MD, USA.*

* cited by examiner

*Primary Examiner* — Vu Le
*Assistant Examiner* — Alexander J Lesnick
(74) *Attorney, Agent, or Firm* — Patterson & Sheridan, LLP

(57) ABSTRACT

According to one embodiment, an image processing apparatus includes an operation unit, a comparative determination unit, and an output unit. The operation unit is configured to calculate a standard deviation and an entropy based on tone information of pixels comprising an image, and calculate a ratio between the standard deviation and the entropy. The comparative determination unit is configured to compare the ratio and a reference value. The output unit is configured to output a comparison result obtained by the comparative determination unit.

17 Claims, 11 Drawing Sheets

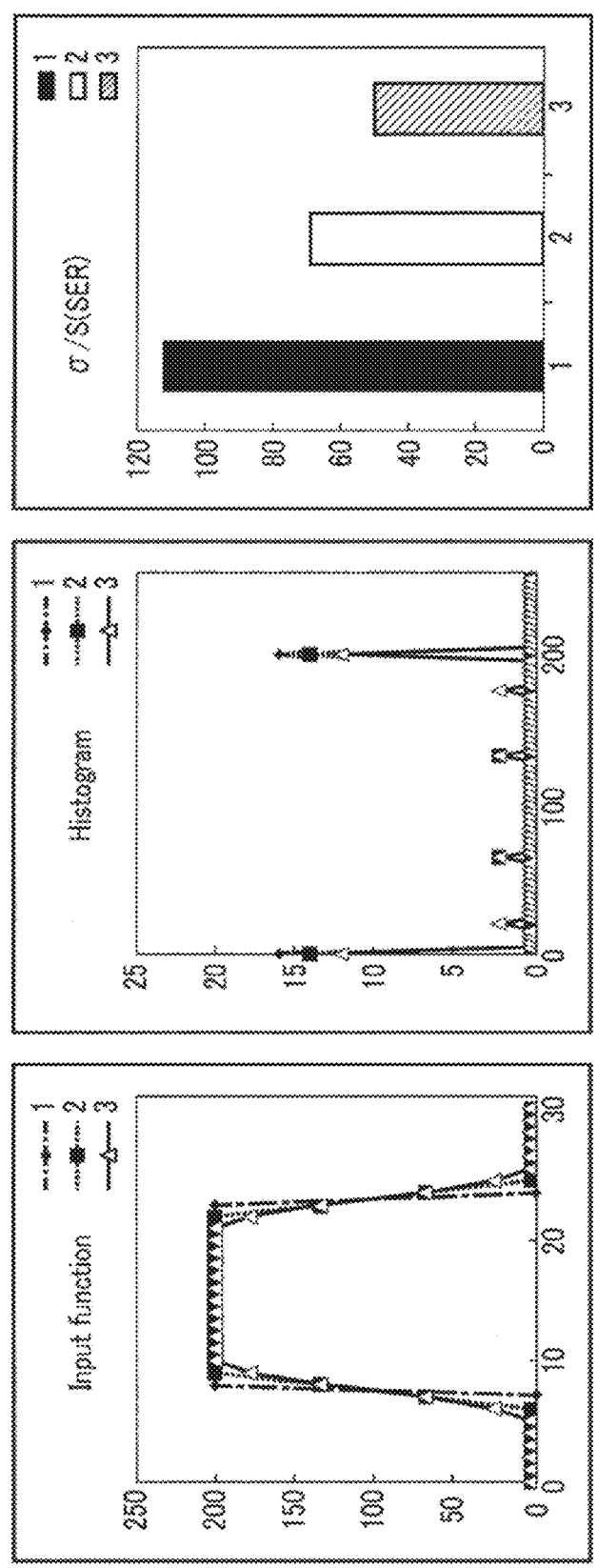

σ = 82
S = 0.6
SER = 68

σ = 71
S = 1.1
SER = 31

σ = 31
S = 0.5
SER = 29

SER=12

SER=8

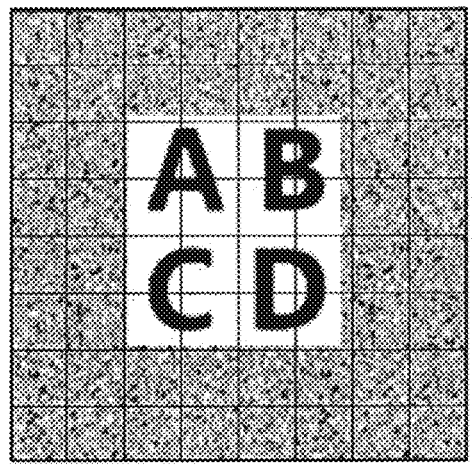
FIG. 8A
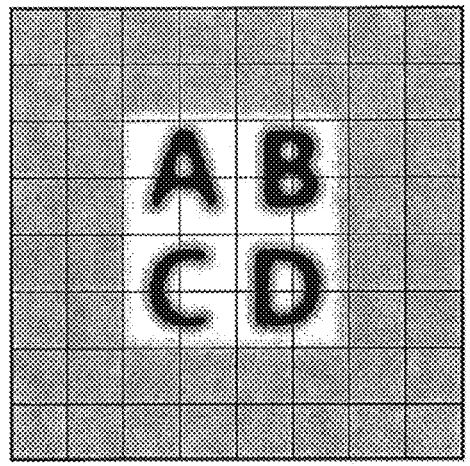
FIG. 8D
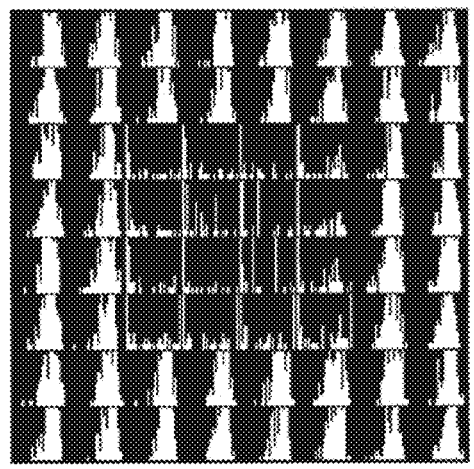
FIG. 8B
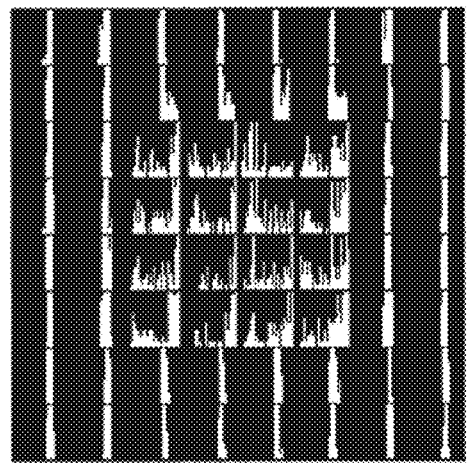
FIG. 8E
FIG. 8C
FIG. 8F

IMAGE PROCESSING APPARATUS AND COMPUTER-READABLE STORAGE MEDIUM

FIELD

Embodiments described herein relate generally to an image processing apparatus and a computer-readable storage medium.

BACKGROUND

In general, a manager of a warehouse or a shop manages a number of articles on shelves. These articles are managed by an apparatus which photographs the articles and identifies the character strings described on the labels attached to the articles shown in the image. The portion of the character string in the image is a binary image region. The binary image region in the image should be clear enough for the apparatus to identify the character string. Therefore, a technique for allowing the clarity of the binary image region to be determined quantitatively is required.

The embodiments described herein solve the above problem by providing an image processing apparatus and a computer-readable storage medium which are capable of quantitatively determining the clarity of the binary image region.

DESCRIPTION OF THE DRAWINGS

FIG. 3A, FIG. 3B, and FIG. 3C show diagrams explaining indexes used for determining clarity.

FIG. 8A, FIG. 8B, FIG. 8C, FIG. 8D, FIG. 8E, and FIG. 8F show diagrams explaining a method of determining clarity by an image processing apparatus.

DETAILED DESCRIPTION

In general, according to one embodiment, an image processing apparatus includes an operation unit, a comparative determination unit, and an output unit. The operation unit is configured to calculate a standard deviation and an entropy based on tone information of pixels comprising an image, and calculate a ratio between the standard deviation and the entropy. The comparative determination unit is configured to compare the ratio and a reference value. The output unit is configured to output a comparison result obtained by the comparative determination unit.

Hereinafter, embodiments will be explained with reference to the drawings.

First Embodiment

Figure 1:
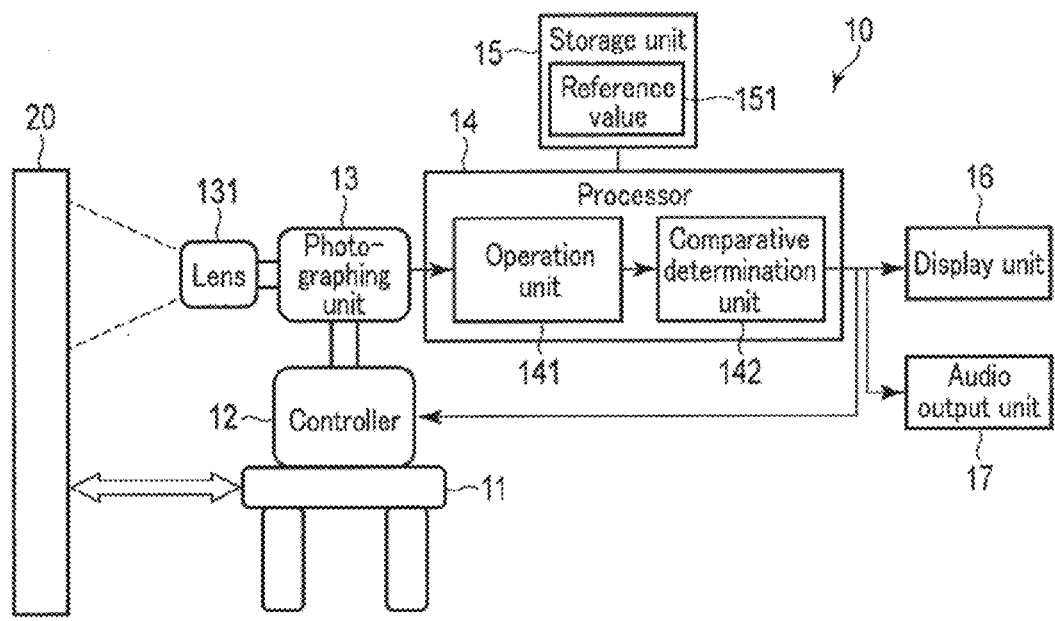
FIG. 1 is a block diagram illustrating an image processing apparatus.

The first embodiment is explained below. FIG. 1 is a block diagram of an image processing apparatus 10 according to the first embodiment.

The image processing apparatus 10 is used for inventory control etc. of a plurality of articles placed on a shelf 20 of a warehouse or a store. The image processing apparatus 10 comprises a moving vehicle 11, a controller 12, a photographing unit 13, a processor 14, a storage unit 15, a display unit 16, and an audio output unit 17. The image processing apparatus 10 does not necessarily have to comprise all of these elements. For example, the image processing apparatus 10 may at least comprise the processor 14 and the storage unit 15.

The moving vehicle 11 is a platform truck capable of moving the image processing apparatus 10 in any direction. The moving vehicle 11 is capable of traveling in a direction parallel to an extending direction of a linearly disposed shelf 20, or a direction perpendicular thereto.

The controller 12 controls the operation of the moving vehicle 11 based on a signal from the processor 14. The controller 12 controls the traveling direction of the moving vehicle 11, or a start and stop of the traveling. The operation of the moving vehicle 11 may be determined either at the processor 14 or the controller 12.

The photographing unit 13 is a camera which comprises a lens 131 and photographs a target. The photographing unit 13 may be a camera for photographing a moving image or a still image. The photographing unit 13 sends data of a photographed image to the processor 14.

The processor 14 corresponds to the center portion of the image processing apparatus 10. The processor 14 controls each element of the image processing apparatus 10 in accordance with an operating system or an application program. The processor 14 comprises an operation unit 141 and a comparative determination unit 142. The processor 14 quantitatively determines, by the operation unit 141 and the comparative determination unit 142, the clarity of a binary image region included in one image photographed by the photographing unit 13. The binary image region is, for example, a region of an image in which letters and symbols etc. are projected. The clarity of the binary image region corresponds to the readability of the binary region, or the extent to which the binary image region is out of focus. The method of quantitatively determining the clarity of the binary image region included in this one image (hereinafter, referred to as clarity determination) will be explained later on.

The processor 14 sends an instruction for operating the moving vehicle 11 to the controller 12. The processor 14 may also send the result of the clarity determination itself to the controller 12. In this case, the controller 12 determines the operation of the moving vehicle 11 based on the clarity determination.

The processor 14 sends a signal regarding display at the display unit 16 to the display unit 16. The processor 14 sends a signal regarding audio output at the audio output unit 17 to the audio output unit 17.

The storage unit 15 includes a memory which stores the operating system and the application program. The storage unit 15 further includes a memory that serves as a work area necessary for the processing performed by the processor 14. The storage unit 15 further includes a memory that stores data necessary for the processing performed by the processor 14. The storage unit 15 stores a plurality of reference values 151. The plurality of reference values 151 are threshold values for clarity determination.

The display unit 16 is a display for displaying videos based on the signal from the processor 14. The audio output unit 17 is a speaker which outputs audio based on the signal from the processor 14. The display unit 16 and the audio output unit 17 are output units.

Figure 2:
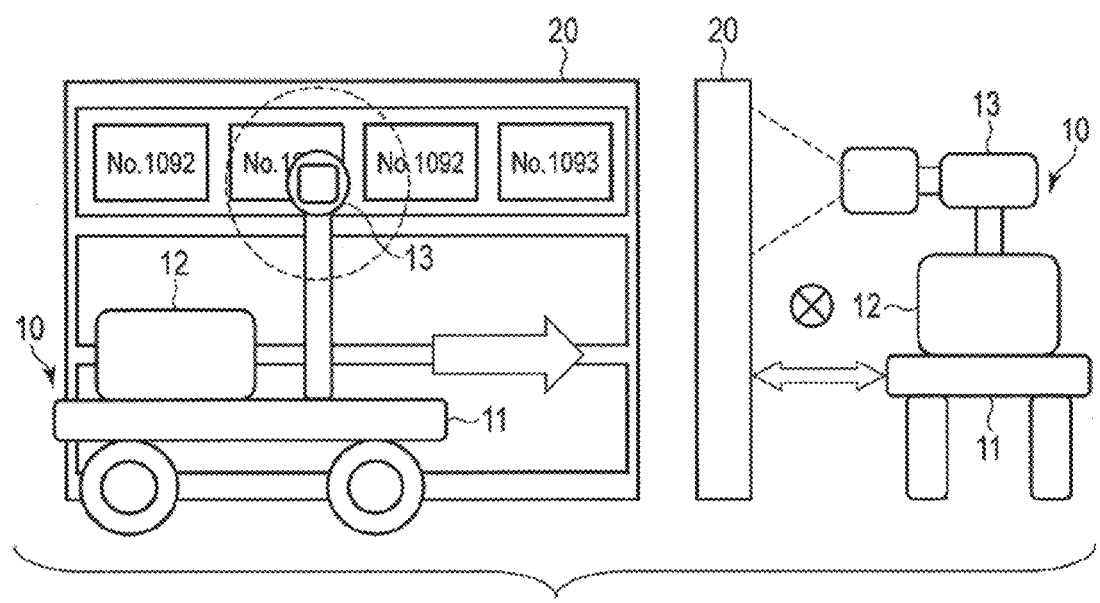
FIG. 2 shows diagrams explaining traveling directions of the image processing apparatus.

FIG. 2 shows diagrams explaining a traveling direction of an image processing apparatus 10 according to the first embodiment. The left diagram in FIG. 2 and the right diagram in FIG. 2 are viewed from right angles to each other. Referring to the left diagram in FIG. 2, the moving vehicle 11 travels causing the image processing apparatus 10 to move in parallel with the extending direction of the shelf 20. Therefore, the photographing unit 13 is capable of photographing each label attached to a plurality of articles mounted on the shelf 20 in sequence while moving in parallel with the extending direction of the shelf 20.

Referring to the right diagram in FIG. 2, the moving vehicle 11 travels causing the image processing apparatus 10 to stop moving in parallel with the extending direction of the shelf 20 and to move in a direction perpendicular to the extending direction of the shelf 20. The image processing apparatus 10 moves to a direction perpendicular to the extending direction of the shelf 20 in order to maintain appropriate distance between the photographing unit 13 and a photographing target (the shelf 20, more specifically, an article mounted on the shelf 20). The distance between the photographing unit 13 and the photographing target may be rephrased as the distance between the moving vehicle 11 and the shelf 20. Therefore, the image processing apparatus 10 is capable of maintaining the clarity of the binary image region included in each image photographed in sequence by the photographing unit 13.

The indexes used for clarity determination are explained below. FIGS. 3A-3C show diagrams explaining the indexes used for determining clarity according to the first embodiment. FIGS. 3A-3C show data regarding three different binary images. The entire image of each of the three images is a binary image region. In FIGS. 3A-3C, data indicated as "1" corresponds to a first image which is in focus. The first image is a clear image. In FIGS. 3A-3C, data indicated as "2" corresponds to a second image which is less in focus than the first image. The second image is not as clear as the first image. In FIGS. 3A-3C, data indicated as "3" corresponds to a third image which is more out of focus than the second image. The third image is not as clear as the second image.

FIG. 3A is a graph showing data of any one line of each of the first image, the second image, and the third image as an input function. The horizontal axis indicates the coordinate of each pixel included in the any one line of one image, and the vertical axis indicates a tone (pixel value). The processor 14 generates the input function from data of one image which is the target of clarity determination. The any one line may correspond to the horizontal axis or the vertical axis of the entire one image.

FIG. 3B is a graph showing a histogram of each of the first image, the second image, and the third image. The horizontal axis indicates a tone, and the vertical axis indicates the number of pixels. The histogram shows the distribution of pixels included in any one line of one image subject to clarity determination, and is tone information of the pixels comprising the image. The processor 14 generates the histogram from the input function. The two peaks in the histogram become sharper as the binary image becomes clearer. Furthermore, the positions of the two peaks in the histogram become more distant as the binary image becomes clearer.

FIG. 3C is a graph showing the ratio between a standard deviation σ and an entropy S (σ/S) (hereinafter, referred to as SER) in each of the first image, the second image, and the third image. The processor 14 calculates the standard deviation σ and the entropy S based on the histogram using the following formula. Subsequently, the processor 14 calculates the SER based on the standard deviation σ and the entropy S.

The formula of the standard deviation σ is as follows.

$$\sigma = \sqrt{\frac{\Sigma(x_i - m)^2}{n}}$$

wherein, $$m = \frac{\Sigma x_i}{n}$$

The formula of the entropy S is as follows.

$$S = \Sigma\left(-\frac{n_i}{n}\log\left(\frac{n_i}{n}\right)\right)$$

Here, $n_i$ is the number of pixels of tone i in the histogram, and n in the total number of pixels in the histogram.

The standard deviation σ is an index expressing separation of at least two peaks in the histogram. The entropy S is an index expressing sharpness in the peaks in the histogram. The SER is an index expressing the clarity of the binary image region quantitatively. The standard deviation σ becomes larger as the two peaks become more distant in the histogram. The entropy S becomes smaller as the two peaks become sharper in the histogram. If the standard deviation σ is large and the entropy S is small, the value of the SER is large.

Referring to FIG. 3C, the SER becomes larger in the order of the third image, the second image, and the first image. This is the order in which the images become more in focus. If the SER is large, the binary image region is considered clear. Therefore, the SER is effective as an index for quantitatively expressing the clarity of the binary image region.

The SER should be a ratio of an index (standard deviation σ is an example) expressing separation of at least two peaks in the histogram, and an index (entropy S is an example) expressing sharpness of the peaks in the histogram. Therefore, the processor 14 may calculate the SER using indexes other than the standard deviation σ and the entropy S. For example, the magnitude of the standard deviation σ changes depending on the brightness of the entire image. Therefore, it is favorable for the processor 14 to calculate the SER using a coefficient of variation obtained by dividing the standard deviation σ by an average value m, instead of using the standard deviation σ. The processor 14 may also calculate the SER using a variance which is a square of the standard deviation σ, instead of using the standard deviation σ. When calculating the entropy S, the processor 14 divides the number of pixels ni of each tone by the number of the entire pixels n. However, the number of pixels ni of each tone does not have to be divided by the number of the entire pixels n.

The SER is not limited to a value that is calculated based on any line of one image. For example, the SER may be an average value of a plurality of SERs calculated from any plurality of lines or all of the lines of one image.

SER differences in different images will be explained below. FIGS. 4A-4F show diagrams indicating values of SERs calculated by the processor 14 according to the first embodiment. FIGS. 4A-4F show three different images in which the same character string ABCD is projected, with respective histograms and respective SERs.

Figure 4A:
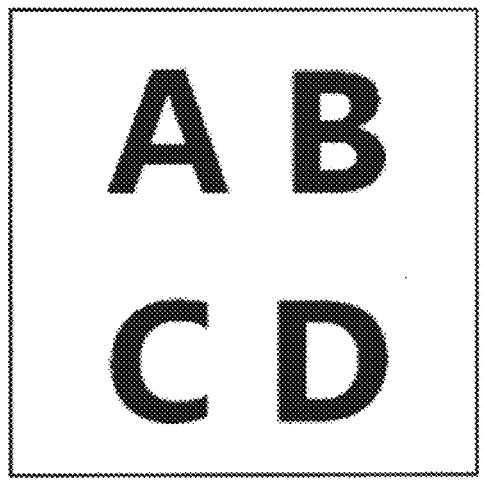
FIG. 4A, FIG. 4B, FIG. 4C, FIG. 4D, FIG. 4E, and FIG. 4F show diagrams indicating values of SERs calculated by the image processing apparatus.
Figure 4C:
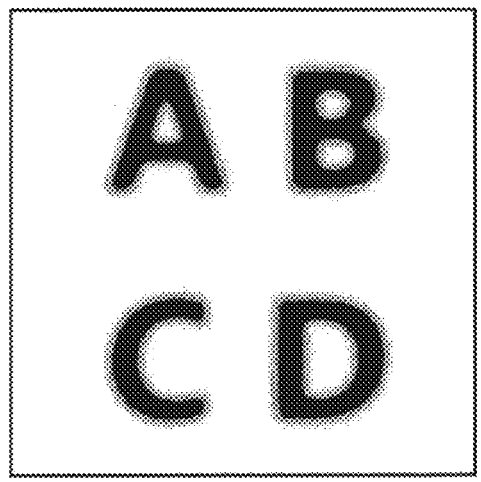

FIG. 4A is a fourth image which is in focus. The fourth image is a clear binary image. The entire image of the fourth image is a binary image region. FIG. 4C is a fifth image which is more out of focus than the fourth image. The fifth image is a binary image which is more unclear than the fourth image. The entire image of the fifth image is a binary image region. FIG. 4E is a sixth image which is more out of focus than the fourth image, however, is more in focus than the fifth image. The sixth image is more unclear than the fourth image, however, is clearer than the fifth image. However, the sixth image overall has a lower contrast than the fourth image.

The processor 14 may calculate the standard deviation $\sigma$, the entropy S, and the SER of each of the fourth image, the fifth image, and the sixth image in the manner mentioned above using FIGS. 3A-3C.

Figure 4B:
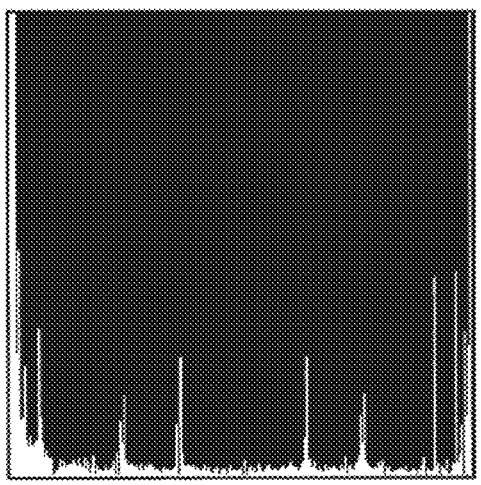
Figure 4D:
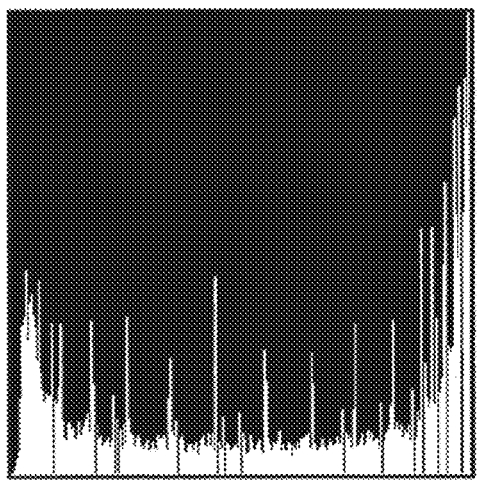
Figure 4E:
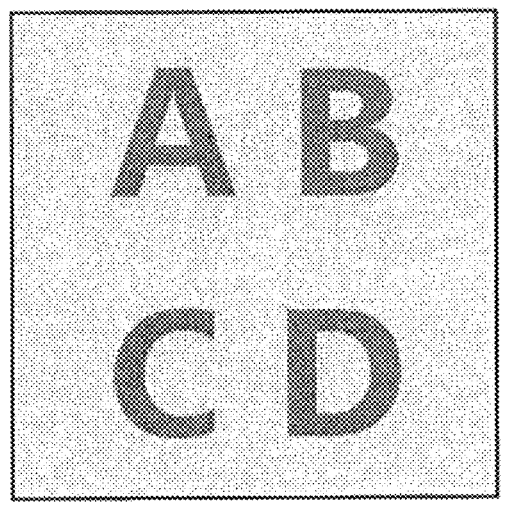
Figure 4F:
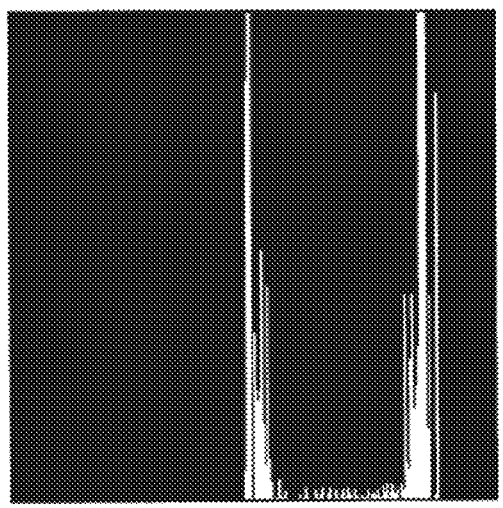

As shown in FIG. 4B, in the fourth image, the standard deviation $\sigma$ is 82, the entropy S is 0.6, and the SER is 68. As shown in FIG. 4D, in the fifth image, the standard deviation $\sigma$ is 71, the entropy S is 1.1, and the SER is 31. As shown in FIG. 4F, in the sixth image, the standard deviation $\sigma$ is 31, the entropy S is 0.5, and the SER is 29.

The SER in the fourth image is equal to or more than twice that of the fifth image. This reflects the difference of the entropy S between the two images. However, the SER in the sixth image is approximately half that of the fourth image. This reflects the difference of the standard deviation $\sigma$ between the two images.

The processor 14 is capable of determining whether or not the binary image region included in the image is clear by comparing the SER and the reference value. If the SER is larger than the reference value, the processor 14 determines that the binary image region is clear. However, if the SER is not larger than the reference value, the processor 14 determines that the binary image region is unclear, or that the contrast of the image itself is low. Therefore, the SER is not only an index which can be used to evaluate the state of clarity of the binary image region, but is also an index which can be used to evaluate the state of contrast of the image itself simultaneously. Thus, the SER is effective as an index for expressing the clarity of the binary image region quantitatively.

Figure 5:
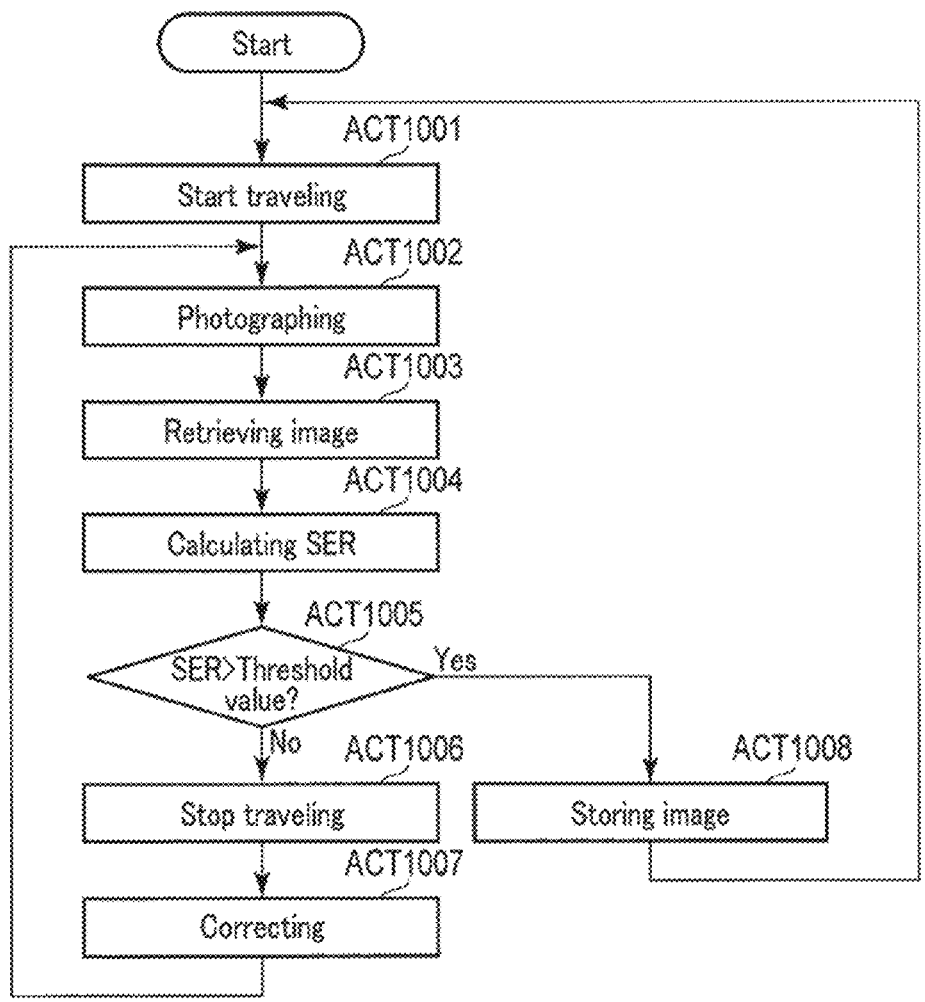
FIG. 5 is a flowchart of an example of processes performed by the image processing apparatus.

An example of processes performed by the image processing apparatus 10 is explained below. FIG. 5 is a flowchart of an example of processes performed by the image processing apparatus 10 according to the first embodiment.

The moving vehicle 11 starts traveling based on the control performed by the controller 12 (Act1001). The moving vehicle 11 travels along a direction in parallel with the extending direction of the shelf 20. The photographing unit 13 photographs articles (photographing target) placed on the shelf 20 while moving (Act1002). The processor 14 retrieves the image photographed by the photographing unit 13 (Act1003). The image retrieved by the processor 14 from the photographing unit 13 in Act1003 is the target image for clarity determination. The processor 14 calculates the standard deviation $\sigma$ and the entropy S based on the entropy of the target image for clarity determination, and calculates the SER based on the standard deviation $\sigma$ and the entropy S (Act1004). Act1004 is performed, for example, by the operation unit 141 in the processor 14.

The processor 14 compares the SER with a first threshold value (Act1005). Act1005 is performed, for example, by the comparative determination unit 142 in the processor 14. The first threshold value corresponds to a first reference value scored in the storage unit 15. The first reference value is a reference for determining whether or not the binary image region included in the image is clear. The first reference value may be set to any value in advance. For example, the first reference value may correspond to the SER of an image including a clear binary image region photographed in advance. If the SER is not larger than the first threshold value, the binary image region is not clear, or the binary image region is not included in the image itself. However, if the SER is larger than the first threshold value, the binary image region is clear.

If the SER is not larger than the first threshold value (Act1005, No), the controller 12 controls the moving vehicle 11 to stop traveling based on the signal from the processor 14 (Act1006). The controller 12 controls the moving vehicle 11 to stop traveling based on a stop command from the processor 14. The controller 12 may also decide on stopping the moving vehicle 11 based on the result of a comparison between the SER sent from the processor 14 and the first threshold value.

If the processor 14 determines that the SER is not larger than the first threshold value in Act1005, the processor 14 may send the comparison result between the SER and the first threshold value to at least one of the display unit 16 and the audio output unit 17. The display unit 16 and the audio output unit 17 output the comparison result sent by the processor 14. The display unit 16 displays the comparison result sent by the processor 14. The audio output unit 17 outputs the comparison result sent by the processor 14 by audio. For example, the comparison result may be the SER and the first threshold value. An another example, the comparison result may be a warning that the binary image region is unclear, or that the photographing unit 13 is out of focus etc. The output from the display unit 16 or the audio output unit 17 will allow a manager to recognize the state of the binary image region included in the image photographed by the photographing unit 13.

Based on the comparison result, the controller 12 controls the distance between the photographing unit 13 and the photographing target projected in the current image to be corrected (Act1007). In Act1007, the controller 12 controls the position of the moving vehicle 11 so that the photographing unit 15 is brought into focus. For example, the controller 12 controls the moving vehicle 11 to travel at a predetermined distance from the shelf 20 in a direction which shortens or increases the distance of the moving vehicle 11 to the shelf 20. The photographing target is the shelf 20, more specifically, the article placed on the shelf 20. The traveling distance of the moving vehicle can be set as desired. The process returns to Act1002, in which the photographing unit 13 photographs the same photographing target again. In other words, the image processing apparatus 10 processes a plurality of images in which the same photographing target is photographed in Act1002 to Act1007 until the SER of the image in which the same photographing target is projected becomes larger than the first threshold value.

If the SER is larger than the first threshold value (Act1005, Yes), the processor 14 stores the current image subject to clarity determination in the storage unit 15 (Act1008). The process returns to Act1001, in which the moving vehicle 11 starts to travel. The image processing apparatus 10 performs clarity determination of a binary image region included in an image which shows the next photographing target.

According to the processes shown in FIG. 5, the image processing apparatus 10 is capable of quantitatively determining the clarity of a binary image region included in an image by using the SER. Therefore, the image processing apparatus 10 is capable of storing each clear image of different photographing targets sequentially while maintaining the distance between the moving vehicle 11 and the shelf 20 appropriately.

Figure 6:
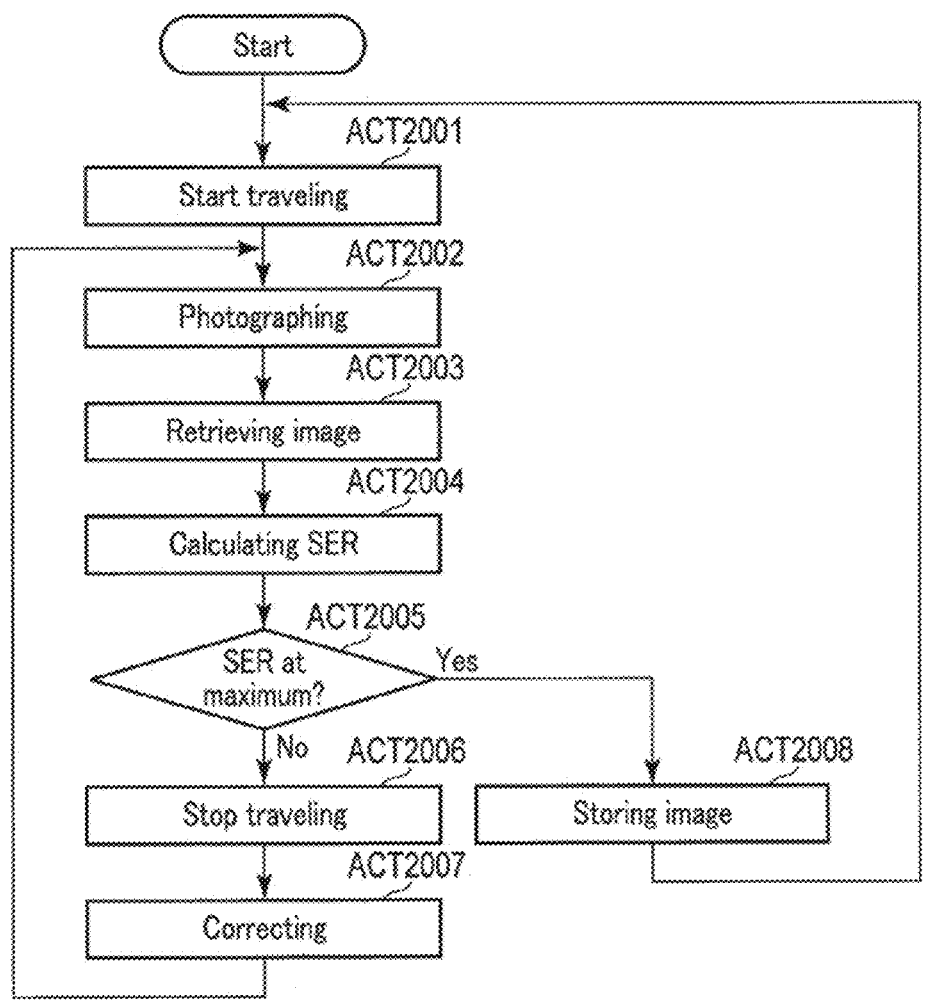
FIG. 6 is a flowchart of another example of processes performed by the image processing apparatus.

Another example of the processes performed by the image processing apparatus 10 is explained below. FIG. 6 is a flowchart of another example of processes performed by the image processing apparatus 10 according to the first embodiment.

The explanations of Act2001 to Act2004 and Act2006 to Act2008 of FIG. 6 will be omitted since they are respectively the same as Act1001 to Act1004 and Act1006 to Act1008.

In Act2005, the processor 14 determines whether or not the SER of the current image subject to clarity determination is at maximum. For example, Act2005 is performed by the comparative determination unit 142 in the processor 14. Here, the process carried out by the processor 14 in Act2005 will be explained assuming that the image subject to clarity determination shows a photographing target X.

In Act2005, the processor 14 determines whether or not the SER of a first piece of an image showing the photographing target X is at maximum. However, at this point, a second threshold value to which the SER of the first piece of an image is to be compared is not stored in the storage unit 15. Therefore, the processor 14 stores the SER of the first piece of an image as a second reference value in the storage unit 15. In other words, the second reference value corresponds to the SER of the past image in which the same photographing target X as the current image is shown. The second threshold value corresponds to the second reference value stored in the storage unit 15.

Returning to Act2005 after going through the processes of Act2006, Act2007, and Act2002 to Act2004, the processor 14 determines whether or not the SER of a second piece of an image showing the photographing target X is at maximum. The second piece of an image is a current image subject to clarity determination. The processor 14 compares the SER of the second piece of an image with the second threshold value. If the SER of the second piece of an image is not larger than the second threshold value, the processor 14 determines that the SER corresponding to the second threshold value is at maximum. In other words, the processor 14 determines that an image showing a photographing target X with a maximum SER is found. In Act2008, the processor 14 stores the image which the calculation of the SER corresponding to the second threshold value is based on in the storage unit 15. In other words, the binary image region of this image is regarded as clear.

If the SER of the second piece of an image is larger than the second threshold value, the processor 14 determines that the SER corresponding to the second threshold value is not at maximum. In other words, the processor 14 determines that an image showing a photographing target X with a maximum SER is not found yet. The processor 14 updates the second reference value based on the SER of the second piece of an image and stores it in the storage unit 15.

Returning again to Act2005 after going through the processes of Act2006, Act2007, and Act2002 to Act2004, the processor 14 determines whether or not the SER of a third piece of an image showing the photographing target X is at maximum. In other words, the image processing apparatus 10 continues processing different images in which the same photographing target X is shown until an SER which is not larger than the second threshold value is found in Act2005. In the manner mentioned above, in Act2005, the processor 14 determines an image which becomes the basis of calculating the maximum SER among a plurality of images in which the same photographing target is shown.

If the processor 14 determines that the SER of the current image subject to clarity determination is not at maximum in Act1005, as explained in FIG. 6, the display unit 16 and the audio output unit 17 may output the comparison result obtained by the processor 14. For example, the comparison result is the SER and the second threshold value. As another example, the comparison result is a warning that the clarity of the binary image region is not at maximum, or that the photographing unit 13 is out of focus, etc.

According to the processes shown in FIG. 6, the image processing apparatus 10 is capable of obtaining an image in which a binary image region has higher clarity than an image obtained by the processes shown in FIG. 5.

Second Embodiment

The second embodiment is explained below. Here, those sections which are different from the first embodiment will be explained; the explanation of those sections which are the same as the first embodiment is omitted.

Figure 7A:
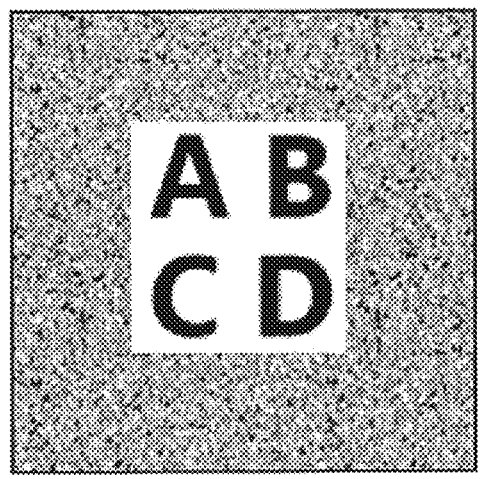
FIG. 7A, FIG. 7B, FIG. 7C, and FIG. 7D show images of comparative examples.
Figure 7C:
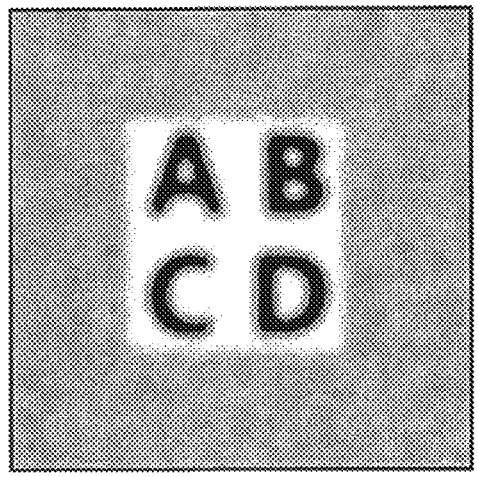
Figure 7B:
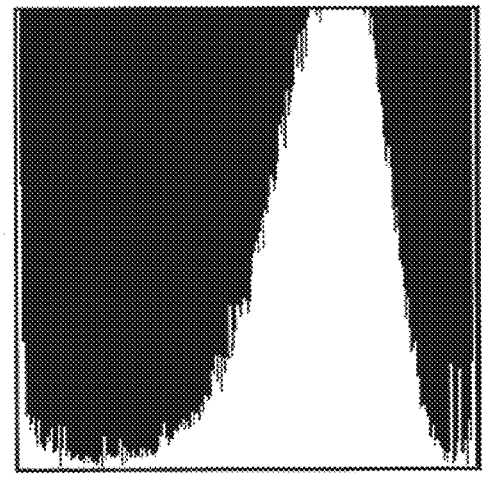
Figure 7D:
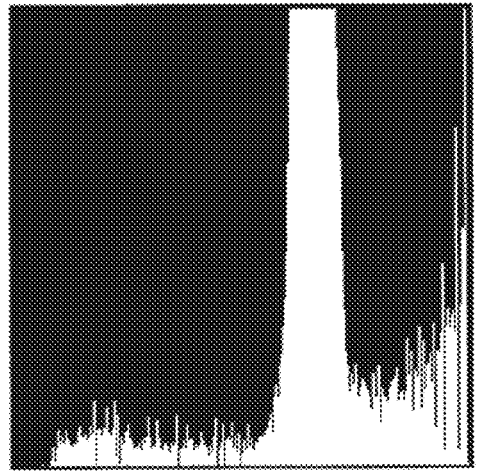

FIGS. 7A-7D show images of comparative examples. FIG. 7 shows two different images in which the same character string ABCD is projected, with respective histograms and respective SERs. FIG. 7A is a seventh image which is in focus. The seventh image is a clear image. FIG. 7C is an eighth image which is more out of focus than the seventh image. In the seventh image and the eighth image, a natural image region surrounds a binary image region. As shown in FIG. 7B, the SER of the seventh image is 12. As shown in FIG. 7D, the SER of the eighth image is 8. There is no sufficient difference between the SER of the seventh image which is in focus and the SER of the eighth image which is out of focus. Therefore, it may be difficult for the image processing apparatus 10 to determine the clarity of the binary image region included in the image only by calculating one SER from one image which is subject to clarity determination. Therefore, the image processing apparatus 10 according to the second embodiment divides one image subject to clarity determination into a plurality of blocks in the manner explained below and calculates the SER of each block.

FIGS. 8A-8F show diagrams explaining a method of determining clarity by a processor 14 according to the second embodiment. FIGS. 8A and 8D are two different images projecting the same character string ABCD as in FIGS. 7A and 7C.

FIG. 8A is a ninth image which is in focus. The ninth image is a clear image. FIG. 8D is a tenth image which is more out of focus than the ninth image. The tenth image is not as clear as the ninth image. In the ninth image and the tenth image, a natural image region surrounds a binary image region.

In the second embodiment, the processor 14 divides one image subject to clarity determination into a plurality of blocks and calculates the SER of each block. Referring to FIGS. 8A and 8D, the processor 14 divides the ninth image and the tenth image into 64 blocks. The processor 14 calculates the SER of each block in the manner explained in the first embodiment based on data of any one line per block. The any one line may correspond to a horizontal axis or a vertical axis of each block. The SER of each block may be an average value of a plurality of SERs calculated from any plurality of lines or all of the lines of each block. The image may be divided into any number of blocks.

In FIG. 8B, a histogram is arranged at a position corresponding to each block of the ninth image. In FIG. 8C, the value of an SER is indicated at a position corresponding to each block of the ninth image. In the ninth image, the value of the SER of the blocks corresponding to the binary image region is equal to or greater than 40.

In FIG. 8E, a histogram is arranged at a position corresponding to each block of the tenth image. In the FIG. 8F, the value of an SER is indicated at a position corresponding to each block of the tenth image. In the tenth image, the value of the SER of the blocks corresponding to the binary image region is equal to or less than 20. Unlike the example shown in FIGS. 7A-7D, in the blocks corresponding to the binary image region, the difference between the SER of an image in focus and the SER of an image out of focus is significant. Therefore, even if it is difficult for the image processing apparatus 10 to determine the clarity of the binary image region based on one SER calculated from one image subject to clarity determination, the clarity of the binary image region can be determined based on each SER calculated from each block of this image.

The processor 14 determines whether or not the binary image region included in the image is clear by comparing the SER and the reference value of each block. If the SER of the block is larger than the reference value, the processor 14 determines that the binary image region included in the block is clear. However, if the SER of the block is not larger than the reference value, the processor 14 determines that the binary image region included in the block is unclear. The SER is effective as an index for quantitatively expressing the clarity of the binary image region even in an image where a natural image region and a binary image region coexist.

Figure 9:
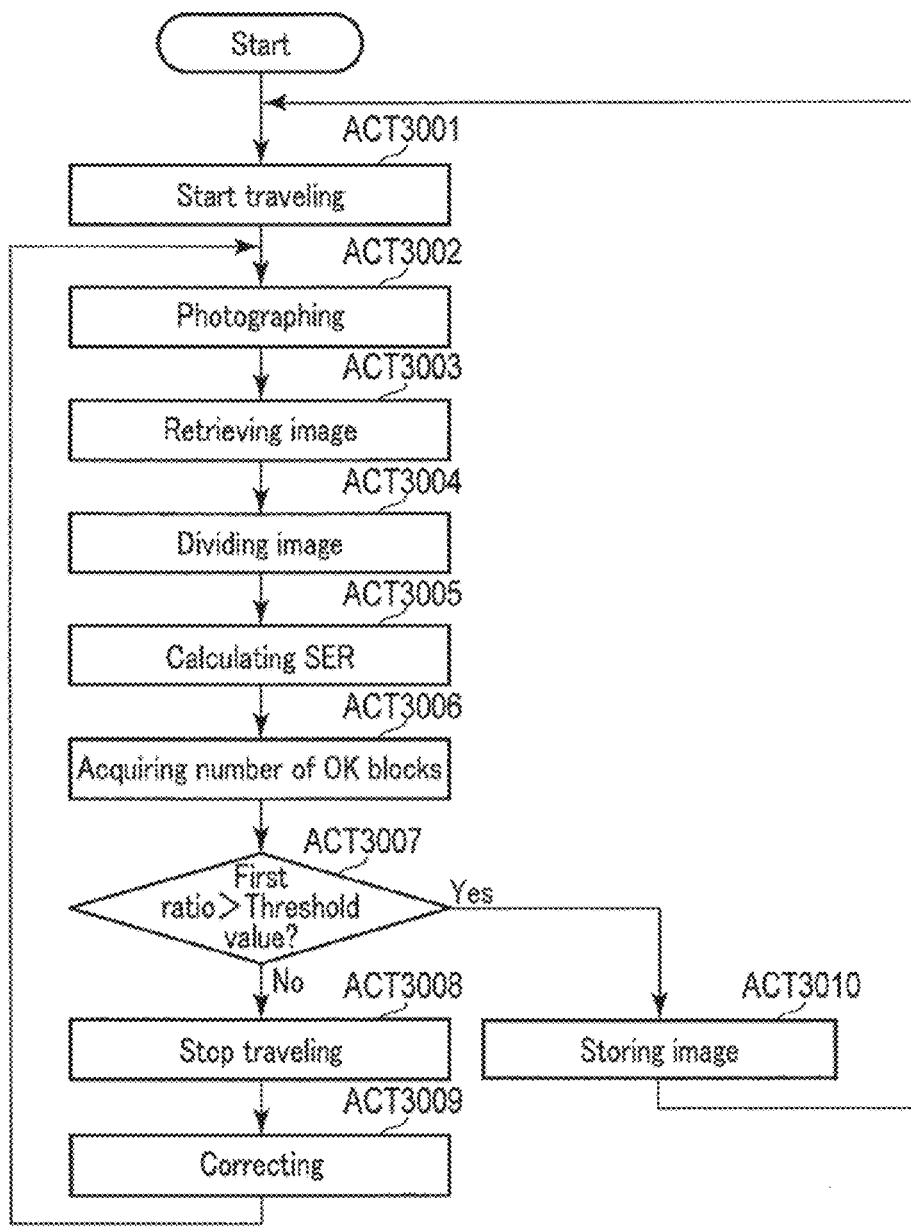
FIG. 9 is a flowchart of an example of processes performed by the image processing apparatus.

An example of the processes performed by the image processing apparatus 10 is explained below. FIG. 9 is a flowchart of an example of processes performed by the image processing apparatus 10 according to the second embodiment.

The moving vehicle 11 starts traveling based on the control performed by the controller 12 (Act3001). The moving vehicle 11 travels along a direction parallel to the extending direction of the shelf 20. The photographing unit 13 photographs an object (photographing target) placed on the shelf 20 while moving (Act3002). The processor 14 retrieves the image photographed by the photographing unit 13 (Act3003). The image retrieved by the processor 14 from the photographing unit 13 in Act3003 is the image subject to clarity determination.

The processor 14 divides this image into a plurality of blocks (Act3004). The processor 14 calculates a standard deviation σ and an entropy S based on the entropy of each block in the plurality of blocks, and calculates the SER of each block based on the standard deviation σ and the entropy S (Act3005). Act3005 is performed, for example, by the operation unit 141 in the processor 14.

The processor 14 acquires the number of OK blocks based on the value of each SER (Act3006). The OK block corresponds to a block including a clear binary image region. In Act3006, for example, the processor 14 acquires the number of OK blocks in the manner below. The processor 14 compares the SER of each block with a third threshold value. The third threshold value corresponds to a third reference value stored in the storage unit 15. The third reference value is a reference for determining whether or not a binary image region included in each block is clear. The third reference value may be set as desired in advance. For example, the third reference value may correspond to an SER value of an image including a clear binary image region photographed in advance. If the SER of the block is not larger than the third threshold value, it indicates that the binary image region included in this block is not clear, or that the binary image region is not included in the block itself. However, if the SER of the block is larger than the third threshold value, it indicates that the binary image region included in this block is clear.

If the SER of a given block is larger than the third threshold value, the processor 14 determines that this block is an OK block. However, if the SER of a given block is not larger than the third threshold value, the processor 14 determines that this block is not an OK block. The processor 14 compares the SER of every block that comprises the image that is subject to clarity determination with the third threshold value. The processor 14 acquires the number of OK blocks from the entire block that comprises the image subject to clarity determination. Here, a value obtained by dividing the number of OK blocks in the image subject to clarity determination by the total number of blocks comprising this image is referred to as a first ratio.

The processor 14 compares the first ratio with a fourth threshold value (Act3007). A fourth reference value is a reference for determining whether or not a binary image region included in an image is clear. The fourth reference value may be set as desired in advance. For example, the fourth reference value may be a value obtained by dividing the number of OK blocks in an image including a clear binary image region photographed in advance by the total number of blocks comprising this image.

If the first ratio is not larger than the first threshold value, it indicates that the binary image region included in the image is not clear, or that the binary image region is not included in the image itself. However, if the first ratio is larger than the first threshold value, it indicates that the binary image region included in the image is clear.

If the first ratio is not larger than the fourth threshold value (Act3007, No), the controller 12 controls the moving vehicle 11 to stop traveling based on the signal from the processor 14 (Act3008). In Act3008, the image processing apparatus 10 may carry out the same process as Act1006 mentioned above. If the processor 14 determines that the first ratio is not larger than the fourth threshold value in Act3007, as explained in FIG. 5, the display unit 16 and the audio output unit 17 may output the comparison result. For example, the comparison result is the first ratio and the fourth threshold value. As another example, the comparison result may be a warning that the binary image region is unclear, or that the photographing unit 13 is out of focus etc.

The controller 12 then corrects the position of the moving vehicle 11 so that the photographing unit 15 comes in focus (Act3009). In Act3009, the image processing apparatus 10 may carry out the same process as Act1007 mentioned above. The process returns to Act3002, in which the photographing unit 13 photographs the same photographing target again. In other words, the image processing apparatus 10 processes a plurality of images in which the same photographing target is photographed by Act3002 to Act3009 until the first ratio of the image showing the same photographing target becomes larger than the fourth threshold value.

If the first ratio is larger than the fourth threshold value (Act3007, Yes), the processor 14 stores the present image which is subject to clarity determination in the storage unit 15 (Act3010). The process returns to Act3001, in which the moving vehicle 11 starts traveling. The image processing apparatus 10 performs clarity determination of a binary image region included in an image which shows the next photographing target.

Figure 10:
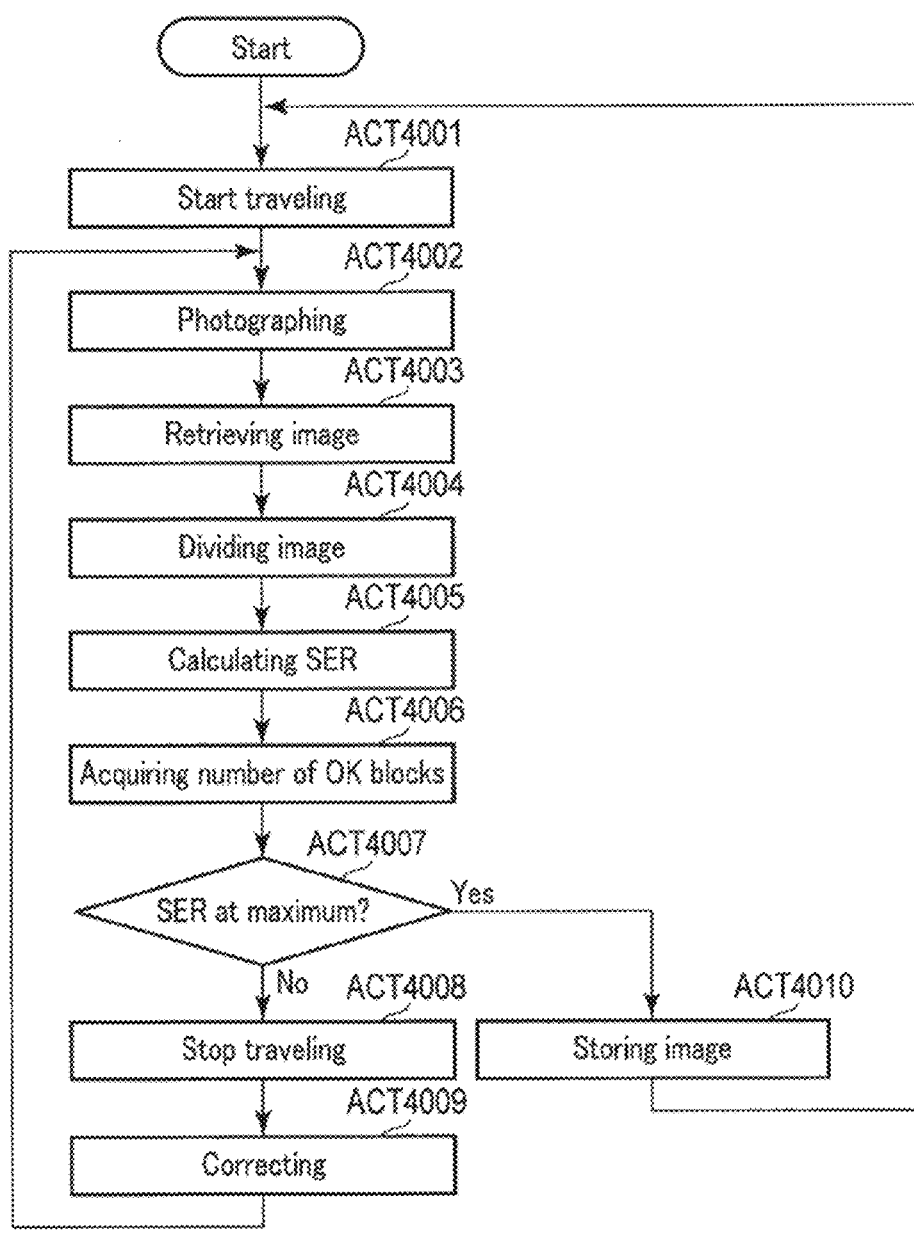
FIG. 10 is a flowchart of another example of processes performed by the image processing apparatus.

Another example of the processes performed by the image processing apparatus 10 is explained below. FIG. 10 is a flowchart of another example of processes performed by the image processing apparatus 10 according to the second embodiment.

Since Act4001 to Act4006 and Act2008 to Act4010 of FIG. 10 are the same as Act3001 to Act3006 and Act3008 to Act3010 of FIG. 9, the explanations thereof will be omitted.

In Act 4007, the processor 14 determines whether or not the first ratio of the current image subject to clarity determination is at maximum. Act4007 is performed by the comparative determination unit 142 in the processor 14. Here, the process carried out by the processor 14 in Act4007 will be explained assuming that the image subject to clarity determination shows a photographing target Y.

In Act4007, the processor 14 determines whether or not the first ratio of a first piece of an image showing the photographing target Y is at maximum. However, at this point, a fifth threshold value to which the first ratio of the first piece of an image is to be compared is not stored in the storage unit 15. Therefore, the processor 14 stores the first ratio of the first piece of an image as a fifth reference value in the storage unit 15. In other words, the fifth reference value corresponds to the first ratio of the past image in which the same photographing target Y as the current image is shown. The fifth threshold value corresponds to the fifth reference value stored in the storage unit 15.

Returning to Act 4007 after going through the processes of Act4008, Act4009, and Act4002 to Act4006, the processor 14 determines whether or not the first ratio of a second piece of an image showing the photographing target Y is at maximum. The second piece of an image is a current image which is subject to clarity determination. The processor 14 compares the first ratio of the second piece of an image with the fifth threshold value. If the first ratio of the second piece of an image is not larger than the fifth threshold value, the processor 14 determines that the first ratio which corresponds to the fifth threshold value is at maximum. In other words, the processor 14 determines that an image showing a photographing target Y with a maximum first ratio is found. In Act4010, the processor 14 stores the image which the calculation of the first ratio corresponding to the fifth threshold value is based on in the storage unit 15. In other words, the binary image region of this image is regarded as clear.

If the first ratio of the second piece of an image is larger than the fifth threshold value, the processor 14 determines that the first ratio which corresponds to the fifth threshold value is not at maximum. In other words, the processor 14 determines that an image showing a photographing target with a maximum first ratio is not found yet. The processor 14 updates the fifth reference value based on the first ratio of the second piece of an image and stores it in the storage unit 15.

In Act4007, which comes after Act4008, Act4009, and Act4002 to Act4006, the processor 14 determines whether or not the first ratio of a third piece of an image showing the photographing target Y is at maximum. In other words, the image processing apparatus 10 continues processing different images in which the same photographing target Y in shown until a first ratio that is not larger than the fifth threshold value is found in Act2007. In the manner mentioned above, in Act2007, the processor 14 determines an image which is to be the basis of calculating the maximum first ratio among a plurality of images which show the same photographing target.

If the processor 14 determines that the first ratio of the current image subject to clarity determination is not at maximum in Act2007, as explained using FIG. 5, the display unit 16 and the audio output unit 17 may output the comparison result. For example, the comparison result in the first ratio and the fifth threshold value. As another example, the comparison result is a warning that the clarity of the binary image region is not at maximum, or that the photographing unit 13 is out of focus, etc.

The image processing apparatus 10 according to the second embodiment is capable of determining the clarity of a binary image region in an image in which a natural image region and a binary image region coexist more accurately than the image processing apparatus 10 according to the first embodiment.

Third Embodiment

Figure 11:
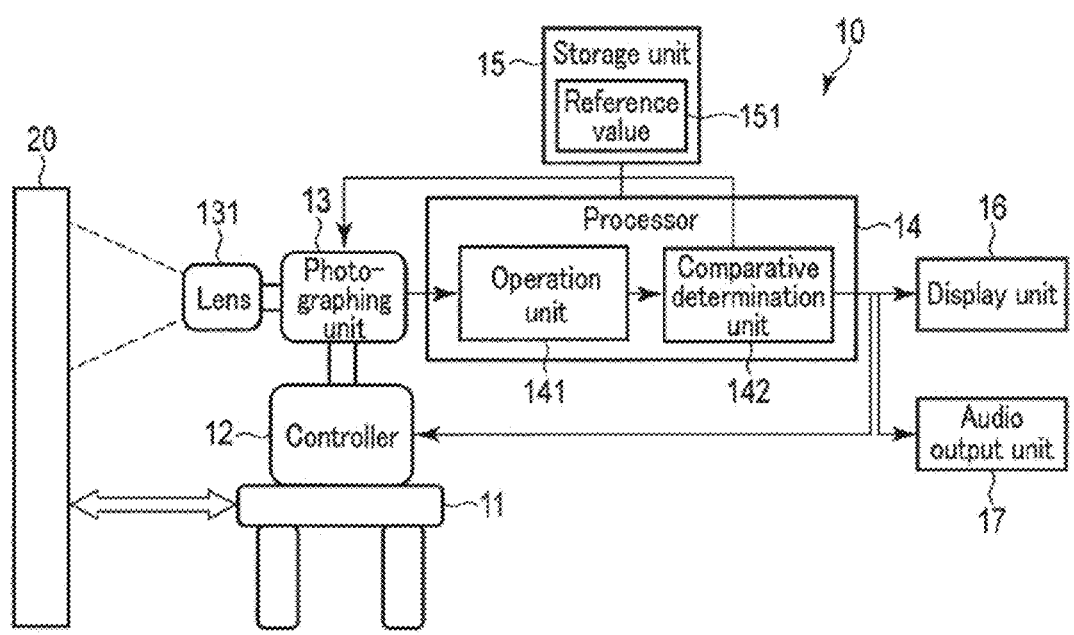
FIG. 11 is a block diagram of an image processing apparatus.

The third embodiment is explained below. FIG. 11 is a block diagram of an example of an image processing apparatus 10 according to the third embodiment. For the configurations similar to the first embodiment, the same reference symbols as used in the first embodiment will be used, and the explanations thereof will be omitted.

A photographing unit 13 according to the third embodiment is a camera with an autofocus function and a focus determination function. The photographing unit 13 corrects the focus based on a signal from a processor 14.

The example of the processing performed by the image processing apparatus 10 according to the third embodiment will be explained using FIGS. 5, 6, 9, and 10. The image processing apparatus 10 according to the third embodiment performs processes different from the first and the second embodiments in Act1007 of FIG. 5, Act2007 of FIG. 6, Act3009 of FIG. 9, and Act4009 of FIG. 10.

In Act1007 of FIG. 5, Act2007 of FIG. 6, Act3009 of FIG. 9, and Act4009 of FIG. 10, the photographing unit 13 corrects the focus of the photographing unit 13 to be brought into focus. The correction amount of the focus may be set as desired. The photographing unit 13 may correct the focus based on a comparison result sent from the processor 14, or based on information of the focus correction amount sent from the processor 14.

After Act1007 of FIG. 5, Act2007 of FIG. 6, Act3009 of FIG. 9, and Act4009 of FIG. 10, the photographing unit 13 photographs the same target again in a state where the focus is corrected.

The third embodiment is capable of obtaining the same effect as the first and the second embodiments.

As used in this application, entities for executing the actions can refer to a computer-related entity, either hardware, a combination of hardware and software, software, or software in execution. For example, an entity for executing an action can be, but is not limited to being, a process running on a processor, a processor, an object, an executable, a thread of execution, a program, and a computer. By way of illustration, both an application running on an apparatus and the apparatus can be an entity. One or more entities can reside within a process and/or thread of execution and a entity can be localized on one apparatus and/or distributed between two or more apparatuses.

The program for realizing the functions can be recorded in the apparatus, can be downloaded through a network to the apparatus and can be installed in the apparatus from a computer readable storage medium storing the program therein. A form of the computer readable storage medium can be any form as long as the computer readable storage medium can store programs and is readable by the apparatus such as a disk type ROM and a Solid-state computer storage media. The functions obtained by installation or download in advance in this way can be realized in cooperation with an OS (Operating System) or the like in the apparatus.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing system comprising:
   a cart having a first processor and a camera mounted on the cart, the camera configured to photograph an object and generate an image, the first processor configured to control movement of the cart and to correct a distance between the cart and the object to be photographed based on correction information to bring the camera into focus with the object to be photographed; and
   a second processor configured to:
      calculate a standard deviation and an entropy based on tone information of pixels in the image,
      calculate a ratio between the standard deviation and the entropy,
      compare the ratio and a reference value,
      determine the correction information based on the comparison result, and
      provide the correction information to the first processor.

2. The image processing system according to claim 1, further comprising a display configured to display the comparison result.

3. The image processing system according to claim 1, further comprising a speaker configured to provide audio output of the comparison result.

4. The image processing system according to claim 1, wherein the first processor corrects a distance between the camera and the object to be photographed based on the correction information.

5. The image processing system according to claim 1, wherein the second processor divides the image into a plurality of blocks, and calculates the standard deviation and the entropy of each block.

6. The image processing system according to claim 1, further comprising a memory,
   wherein the second processor updates the reference value based on a value of the ratio, and
   the memory stores the updated reference value.

7. A non-transitory computer-readable storage medium which stores a program for controlling an image processing system comprising a cart with a camera mounted thereto, a first processor and a second processor, the program causing the first processor and second processor to perform as follows:
   the first processor controls movement of the cart and corrects, based on correction information, a distance between the cart and an object to be photographed by the camera to bring the camera into focus with the object to be photographed; and
   the second processor:
      calculates a standard deviation and an entropy based on tone information of pixels in the image,
      calculates a ratio between the standard deviation and the entropy,
      compares the ratio and a reference value,
      determines correction information based on the comparison result, and
      outputs the correction information to the first processor.

8. The image processing apparatus according to claim 1, wherein the cart includes a wheel that is driven to move the cart.

9. The image processing apparatus according to claim 1, wherein the reference value is a predetermined threshold value.

10. The image processing apparatus according to claim 1, wherein the reference value is a maximum value of the ratio.

11. The image processing apparatus according to claim 5, wherein, when a number of blocks with a comparison result equal to or greater than a predetermined threshold value is equal to or lower than a predetermined value, the second processor outputs the correction information to the first processor.

12. An image processing method comprising:
    controlling movement of a cart having a camera mounted thereto, the movement being controlled by a first processor based on correction information for correcting a distance between the cart and an object to be photographed in order to bring the camera into focus with the object to be photographed;
    photographing the object with the camera and generating an image;
    calculating, with a second processor, a standard deviation and an entropy based on tone information of pixels in the image;
    calculating, with the second processor, a ratio between the standard deviation and the entropy;
    comparing, with the second processor, the ratio and a reference value;
    determining the correction information based on the comparison result; and
    outputting the correction information to the first processor.

13. The image processing method according to claim 12, further comprising:
    dividing, with the second processor, the image into a plurality of blocks, wherein
    calculating the standard deviation, the entropy and the ratio, and comparing the ratio and the reference value is performed for each block.

14. The image processing method according to claim 13, wherein, when a number of blocks with a comparison result equal to or greater than a predetermined threshold value is equal to or lower than a predetermined value, the second processor outputs the correction information to the first processor.

15. The image processing method according to claim 12, further comprising:
   updating, with the second processor, the reference value based on a value of the ratio; and
   storing, with the second processor, the updated reference value to a memory.

16. The image processing method according to claim 12, wherein the reference value is a predetermined threshold value.

17. The image processing method according to claim 12, wherein the reference value is a maximum value of the ratio.

* * * * *